United States Patent
Beck et al.

(10) Patent No.: US 11,573,477 B2
(45) Date of Patent: Feb. 7, 2023

(54) CROSSTALK REDUCTION IN MULTI-CHANNEL ACOUSTO-OPTIC MODULATORS

(71) Applicant: University of Maryland, College Park, College Park, MD (US)

(72) Inventors: Kristin Beck, College Park, MD (US); Marko Cetina, College Park, MD (US); Michael Goldman, Washington, DC (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 17/150,909

(22) Filed: Jan. 15, 2021

(65) Prior Publication Data

US 2021/0263390 A1    Aug. 26, 2021

Related U.S. Application Data

(60) Provisional application No. 62/965,091, filed on Jan. 23, 2020.

(51) Int. Cl.
  *G02F 1/33* (2006.01)
  *G02F 1/11* (2006.01)
  *H04J 14/02* (2006.01)

(52) U.S. Cl.
  CPC .............. *G02F 1/332* (2013.01); *G02F 1/113* (2013.01); *H04J 14/0213* (2013.01)

(58) Field of Classification Search
  CPC ... G02F 1/11; G02F 1/33; G02F 1/332; G02F 1/113; G02F 1/116; G02F 1/335;
  (Continued)

(56) References Cited

U.S. PATENT DOCUMENTS 9,915,851 B1    3/2018  Wasilousky et al.
9,958,710 B1 *  5/2018  Morse ................. G02F 1/11
(Continued)

FOREIGN PATENT DOCUMENTS

EP    0 424 493 A1    5/1991
EP    3 319 017 A1    5/2018
WO      9903016 A1    1/1999

OTHER PUBLICATIONS

Mizutori Akira et al., "Demonstration of four-wave-mixing induced crosstalk cancellation in 10-Gbit/s phase locked multi-carrier transmission", 2013 18th Optoelectronics and Communications Conference Held Jointly With 2013 International Conference on Photonics in Switching (OECC/PS), IEICE, Jun. 30, 2013 (Jun. 30, 2013), pp. 1-2, XP032482508, DOI: 10.1587/COMEX.2.435 [retrieved on Sep. 12, 2013] paragraph [0111] figure 3.

(Continued)

*Primary Examiner* — Jie Lei
(74) *Attorney, Agent, or Firm* — Arentfox Schiff LLP

(57) ABSTRACT

Aspects of the present disclosure describe techniques for controlling coherent crosstalk errors that occur in multi-channel acousto-optic modulators (AOMs) by applying cancellation tones to reduce or eliminate the crosstalk errors. For example, a method and systems are described that include applying a first radio frequency (RF) tone to generate a first acoustic wave in a first channel of the multi-channel AOM, wherein a portion of the first acoustic wave interacts with a second channel to cause a crosstalk effect, and applying a second RF tone to generate a second acoustic wave in the second channel, wherein the second acoustic wave reduces or eliminates the crosstalk effect caused by the portion of the first acoustic wave.

13 Claims, 9 Drawing Sheets

(58) Field of Classification Search
CPC .......... G02F 1/01; G02F 1/0134; G02F 1/125;
H01S 3/106; H01S 3/1068; H01S 3/117;
H04B 3/32; H04B 10/2575; G01J 3/12;
G01J 3/1256; H04J 14/0213; G06N 10/00
USPC ........ 359/310–312, 314, 285–287, 238, 245,
359/278, 305, 321
See application file for complete search history.

(56) References Cited

U.S. PATENT DOCUMENTS

| | | |
|---|---|---|
| 2014/0071456 A1 | 3/2014 | Podoleanu et al. |
| 2018/0203265 A1 | 7/2018 | Morse et al. |

OTHER PUBLICATIONS

International Search Report and Written Opinion, issued by International Searching Authority in corresponding International Application No. PCT/US2021/013799, dated Oct. 7, 2021.

\* cited by examiner

CROSSTALK REDUCTION IN MULTI-CHANNEL ACOUSTO-OPTIC MODULATORS

CROSS REFERENCE TO RELATED APPLICATIONS

The present application claims priority to and the benefit of U.S. Provisional Patent Application No. 62/965,091, entitled "CROSSTALK REDUCTION IN MULTI-CHANNEL ACOUSTO-OPTIC MODULATORS," and filed on Jan. 23, 2020, the contents of which are incorporated herein by reference in their entirety.

GOVERNMENT LICENSE RIGHTS

This invention was made with government support under Award No. W911NF1610082 awarded by the Intelligence Advanced Research Projects Activity. The government has certain rights in the invention.

BACKGROUND

Aspects of the present disclosure relate generally to cancelling crosstalk noises in nearby channels of a trapped ion quantum computer, and more particularly, the present disclosure describes techniques that are used to control coherent crosstalk errors in multi-channel acousto-optic modulators (AOMs) using cancelation tones.

Trapped atoms are one of the leading implementations for quantum information processing (QIP) or quantum computing. Atomic-based qubits can be used as quantum memories, as quantum gates in quantum computers and simulators, and can act as nodes for quantum communication networks. Qubits based on trapped atomic ions enjoy a rare combination of attributes. For example, qubits based on trapped atomic ions have very good coherence properties, can be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

The accuracy with which atomic-based qubits are manipulated is important to avoid systematic errors during quantum operations. In a trapped ion quantum computer, AOMs are used to control optical beams that are deflected from the AOMs, which in turn are used to control the atomic-based qubits. In a multi-channel AOM, where each channel may correspond to an individual optical beam and its atomic-based qubit, the application of radio frequency (RF) energy or an RF signal in one channel may inadvertently impact one or more other channels. For example, turning on one channel may result in an adjacent or nearby channel being unintentionally turned on. In some instances, a portion of the RF energy and/or acoustic energy associated with one channel in a multi-channel AOM may "leak" into one or more neighboring channels. The "leak" contributes to crosstalk noise or errors, and may negatively impact the operation and/or control of the AOM. It is therefore important to minimize the impact of crosstalk noise on neighboring channels in a multi-channel AOM to avoid the unintended effects of such crosstalk noise on non-targeted atomic-based qubits.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of this disclosure, a method includes applying a first radio frequency (RF) tone to generate a first acoustic wave in a first channel of the multi-channel AOM, wherein the first acoustic wave interacts with a second channel of the multi-channel AOM to cause a crosstalk effect on the second channel and applying a second RF tone to generate a second acoustic wave in the second channel, wherein the second acoustic wave reduces or eliminates the crosstalk effect caused by the portion of the first acoustic wave.

In some aspects of the present disclosure, a acousto-optic modulator (AOM) system includes an AOM crystal, a first transducer disposed over a first channel of the AOM crystal, a second transducer disposed over a second channel of the AOM crystal, a first waveform generator configured to apply a first radio frequency (RF) tone to generate a first acoustic wave in a first channel of the multi-channel AOM, wherein the first acoustic wave interacts with a second channel of the multi-channel AOM to cause a crosstalk effect on the second channel, and a second waveform generator configured to apply a second RF tone to generate a second acoustic wave in the second channel, wherein the second acoustic wave reduces or eliminates the crosstalk effect caused by the portion of the first acoustic wave.

In another aspect of this disclosure, a quantum information processing (QIP) system includes an AOM crystal, a first transducer disposed over a first channel of the AOM crystal, a second transducer disposed over a second channel of the AOM crystal, a first waveform generator configured to apply a first radio frequency (RF) tone to activate the first transducer to generate a first acoustic wave in the first channel, wherein a portion of the first acoustic wave interacts with the second channel to cause a crosstalk effect on the second channel, a second waveform generator configured to apply a second RF tone to activate the second transducer to generate a second acoustic wave in the second channel, wherein the second acoustic wave reduces or eliminates the crosstalk effect caused by the portion of the first acoustic wave, a trapped ion, and an optical source configured to emit a light through the AOM crystal to change a state of the trapped ion.

In another aspect of the disclosure, a method of operating a multi-channel AOM includes calculating initial RF tones to be applied to multiple channels of the AOM, calculating, in response to the application of the initial RF tones, compensation RF tones to be added to the initial RF tones to at least partially correct for undesired crosstalk effects; and calculating, in response to the application of the initial RF tones and the compensation RF tones, subsequent compensation RF tones to be added to the initial RF tones until the crosstalk effect in each of the multiple channels is below a threshold level.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
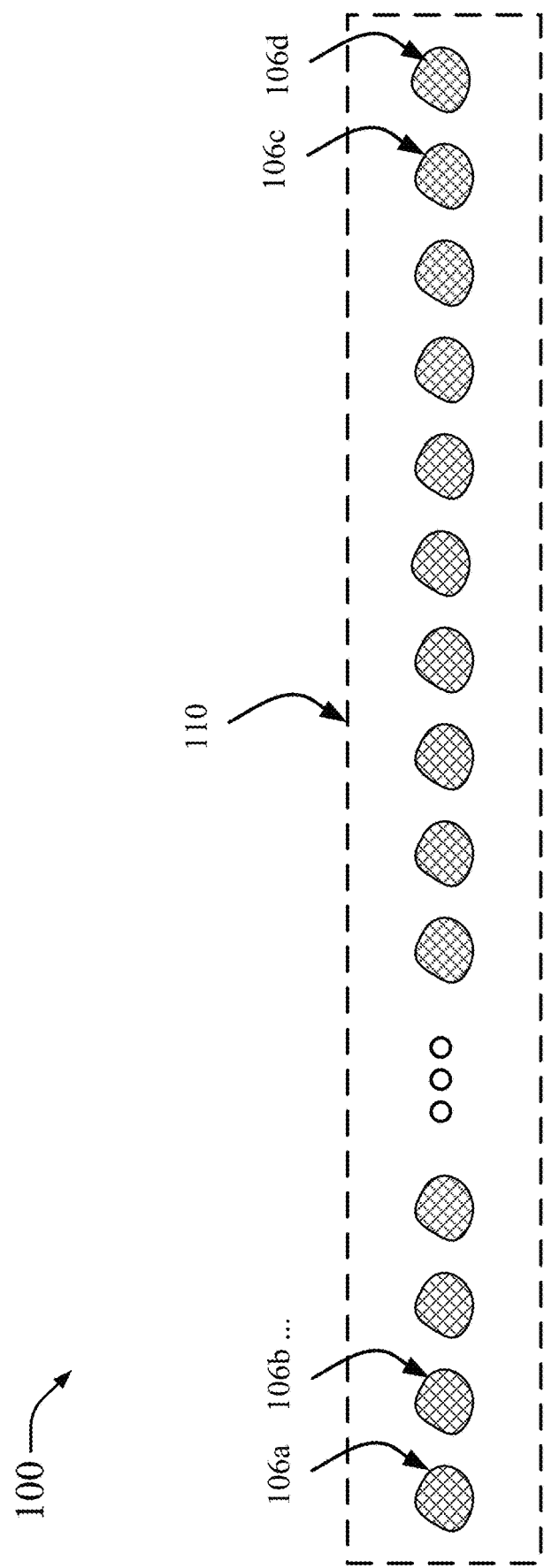
FIG. 1 illustrates a view of a vacuum chamber that houses electrodes for the trapping of atomic ions a linear crystal in accordance with aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

As described above, trapped atoms may be used to implement quantum information processing systems or quantum computers. Atomic-based qubits can be used as different type of devices, including but not limited to quantum memories, quantum gates in quantum computers and simulators, and nodes for quantum communication networks. As used in this disclosure, the terms "atomic ions," "atoms," and "ions" may be used interchangeably to describe the particles that are to be confined, or are actually confined, in a trap to form a crystal or similar arrangement or configuration.

Individual addressing of each ion that is trapped in an ion trap may be needed to control the phase, frequency, and/or amplitude, and also the polarization, as required by a particular quantum gate or quantum operation to be implemented using the ion. One or more optical beams may be used to individually address the trapped ions, and in some instances, a global optical beam may be applied to all of the trapped ions. These counter-propagating optical beams, referred to as Raman optical beams or simply as Raman beams, may be produced by using multi-channel AOMs, which is a crystal having various piezo-electric transducers patterned with radio-frequency antennas, traces, or electrodes on one side and a radio-frequency absorber on the other side that deflect optical beams and shift its frequencies. The interaction with each optical beam may be separately controlled by a radio-frequency (RF) waveform generator and a piezo-electric transducer in a respective channel of the multi-channel AOM.

A problem arises in a multi-channel AOM when the application of RF energy or an RF signal in one channel may inadvertently impact another channel. For example, turning on one channel may result in an adjacent or nearby channel being unintentionally turned on, e.g., unintentionally deflecting the optical beam present in that channel. In some instances, a portion of the RF energy and/or acoustic energy associated with one channel in the multi-channel AOM may "leak" into one or more neighboring channels. The "leak" may contribute to crosstalk noise and/or errors, and may negatively impact the operation and/or control of the atomic-based qubits controlled by the multi-channel AOM (e.g., causing unintentional changes to the states of the trapped ions). To reduce or eliminate crosstalk among individual channels, additional compensation tones may be applied to each channel of the AOM. The compensation tones may cancel/reduce crosstalk signals "leaked" from neighboring channels. It is to be understood that in some cases the compensation tones may themselves generate crosstalk and the process may need to be iterated until the overall effect of crosstalk is reduced in the various channels of a multi-channel AOM.

Solutions to the issues described above are explained in more detail in connection with FIGS. 1-9.

FIG. 1 shows a diagram 100 that illustrates multiple atomic ions 106 trapped in a linear crystal or chain 110 using a linear RF Paul trap (the linear crystal 110 can be inside a vacuum chamber not shown). In the example shown in FIG. 1, a vacuum chamber in a quantum system includes electrodes for trapping multiple (e.g., N=20) atomic Ytterbium ions (e.g., $^{171}Yb^+$ ions) which are confined in the chain 110 and are laser-cooled to be nearly at rest. The number of atomic ions trapped can be configurable and more or fewer atomic ions may be trapped. The atoms are illuminated with laser (optical) radiation tuned to a resonance in $^{171}Yb^+$ and the fluorescence of the atomic ions is imaged onto a camera. In this example, atomic ions are separated by about 5 microns (μm) from each other. The separation of the atomic ions is determined by a balance between the external confinement force and Coulomb repulsion and does not need to be uniform. Moreover, in addition to atomic Ytterbium ions, neutral atoms, Rydberg atoms, other atomic ions or species of atomic ions may also be used. Instead of linear RF Paul traps, optical or other form of confinement may be used. Thus, a confinement device may be based on different techniques and may hold ions, neutral atoms, or Rydberg atoms, for example, with an ion trap being one example of such a confinement device.

Figure 2:
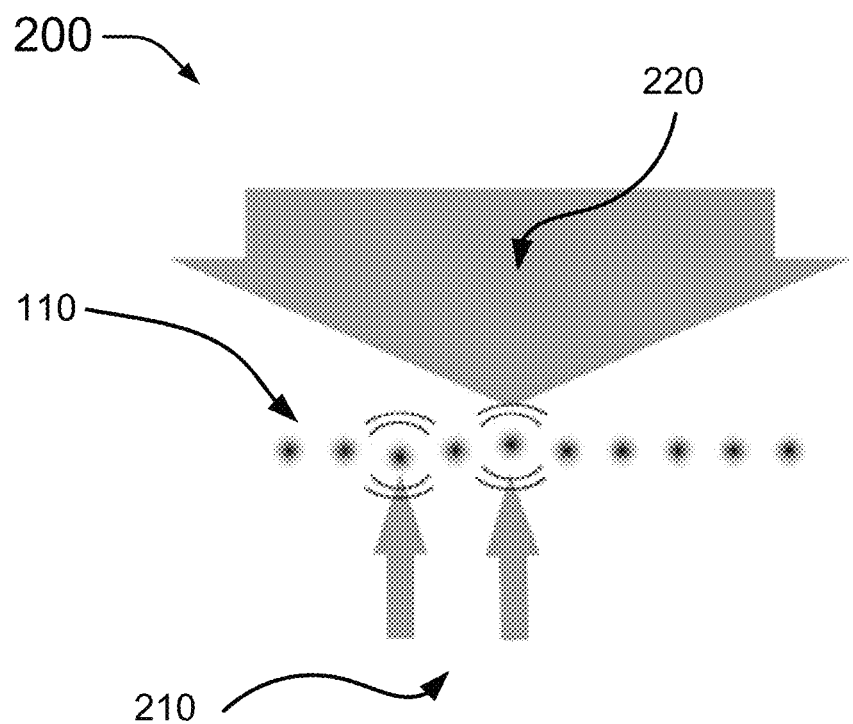
FIG. 2 is a diagram illustrating an example of Raman beam geometry in accordance with aspects of the disclosure.

FIG. 2, which shows a diagram 200 illustrating an example of Raman optical beam geometry for use in trapped ion systems in which individual optical beams 210 and a global optical beam 220 are directed to the chain 110 having the atomic ion qubits to control the atomic ion qubits to perform quantum operations. The optical beams in the same direction may be referred to as co-propagating optical beams and the optical beams in different or opposite directions may be referred to as non-co-propagating or counter-propagating optical beams, respectively. The individual optical beams 210 (co-propagating) are focused optical beams that individually address the ions, while the global optical beam 220 (which, as shown, counter-propagates with respect to the individual beams 210) may be an unfocused or focused optical beam that impinges on all of the ions. In some instances, instead of the global optical beam 220 additional individual optical beam 210 may also be used. As used herein, the terms laser beams, optical beams, beams, optical fields, and fields may be used interchangeably. Each of the individual optical beams 210 can be controlled by, for example, a different channel in a multi-channel AOM. The global optical beam 220 can also be controlled by a respective channel in an AOM.

Figure 3:
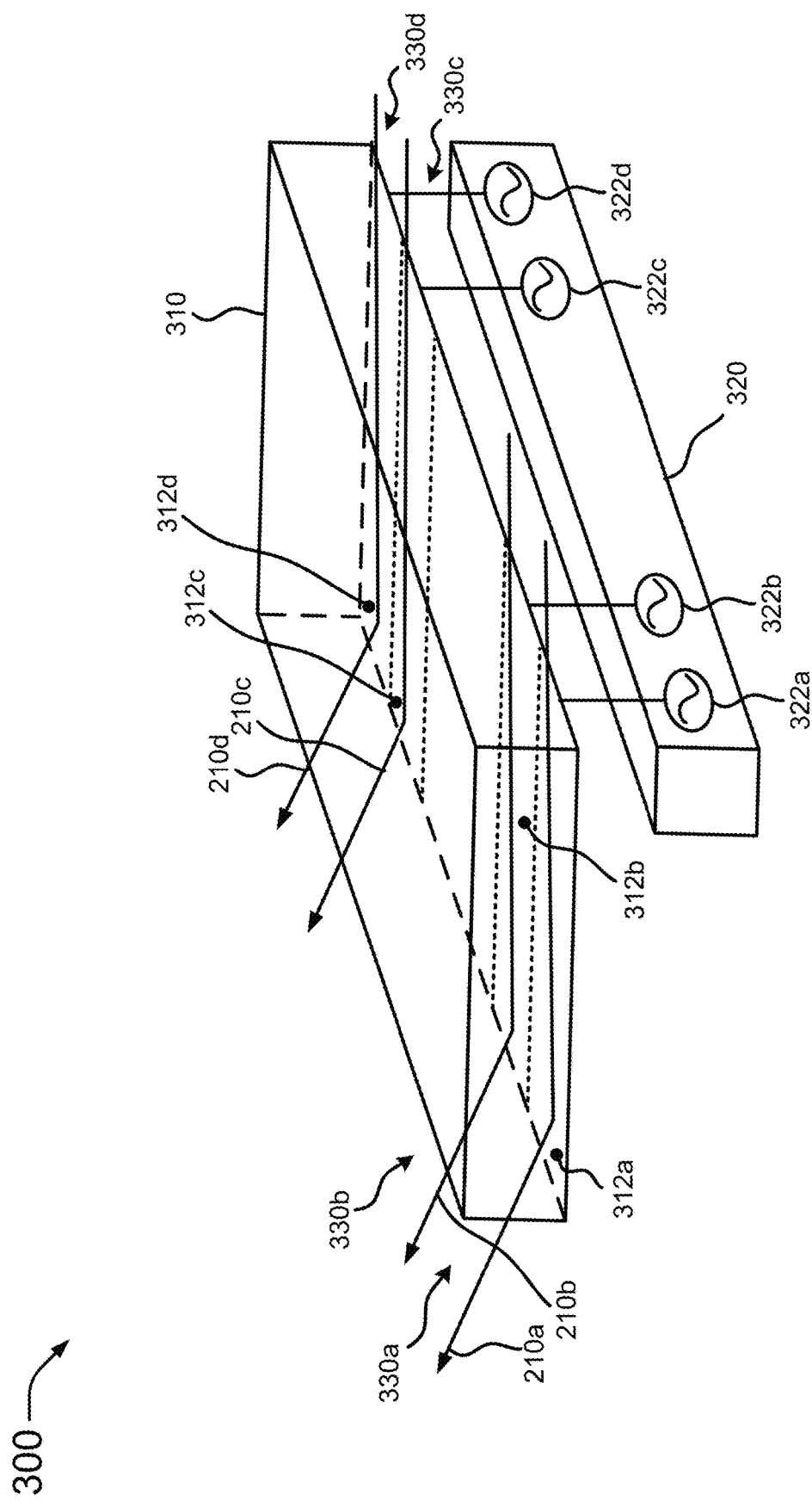
FIG. 3 is a diagram illustrating an example of a multi-channel acousto-optic modulator (AOM) with crosstalk compensation in accordance with aspects of this disclosure.

Turning now to FIG. 3, an example of a system 300 including a multi-channel acousto-optic modulator (AOM) 310 configured to enable crosstalk compensation. The optical source or sources and the transmitted beam are not shown for simplicity. The AOM 310 may include one or more channels. Each channel may include a waveform generator for modulating (e.g., changing the characteristics) the optical beam deflected by that channel. For example, each channel may include a waveform generator that applies an RF signal (or "tone") to a transducer (e.g., traces or electrodes on an AOM crystal), which in turn applies an acoustic wave to the channel (e.g., forms a corresponding acoustic column for the channel in the AOM crystal). The applied acoustic wave may modulate the optical beam passing through the channel by vibrating a portion of the channel and changing the refraction index of the portion of the channel. In other words, the transducer may modulate the optical beam deflected by the channel by changing the amplitude and/or frequency of the acoustic wave. This modulation may also change characteristics of the optical beam transmitted through the respective channel.

In one instance, the AOM 310 may be multi-channel Bragg cell having piezo-electric transducers 312a-d that locally apply acoustic waves to the AOM 310. The piezo-electric transducers 312a-d may be controlled by a controller 320 (which may be part of an optical controller 820 described below in connection with FIG. 8) having waveform generators 322a-d. The waveform generators 322a-d may be arbitrary waveform generators (AWGs) and/or direct digital synthesizers. The waveform generators 322a-d may apply RF signals (or "tones") of specific frequencies to generate acoustic waves. The individual beams 210a-d may be provided to separately illuminate some of the trapped ions 110, as shown above in connection with FIG. 2. The AOM 310 may be a multi-channel AOM and include multiple channels 330.

Still referring to FIG. 3, in certain implementations, the frequency, amplitude, and/or phase of each of the individual beams 210a-d may be modulated by AOM 310. For example, the waveform generator 322a may cause the transducer 312a to generate a first acoustic wave (e.g., a first acoustic column) having a first predetermined quality in the first channel 330a. The first acoustic wave generated by the transducer 312a may cause the deflected individual optical beam 210a to have a first frequency, a first phase, and/or a first amplitude. In another example, the waveform generator 322b may cause the transducer 312b to generate a second acoustic wave (e.g., a second acoustic column) having a second predetermined quality in the second channel 330b. The second acoustic wave generated by the transducer 312b may cause the deflected individual optical beam 210b to have a second frequency, a second phase, and/or a second amplitude. In another example, the waveform generator 322c may cause the transducer 312c to generate a third acoustic wave (e.g., a third acoustic column) having a third predetermined quality in the third channel 330c. The third acoustic wave generated by the transducer 312c may cause the deflected individual optical beam 210c to have a third frequency, a third phase, and/or a third amplitude. In yet another example, the waveform generator 322d may cause the transducer 312d to generate a fourth acoustic wave (e.g., a fourth acoustic column) having a fourth predetermined quality in the fourth channel 330d. The fourth acoustic wave generated by the transducer 312d may cause the deflected individual optical beam 210d to have a fourth frequency, a fourth phase, and/or a fourth amplitude. The multi-channel AOM 310 may include as few as two channels and as many as 32 channels or more, and each channel may have a corresponding waveform generator and transducer as described above.

In some aspects of the present disclosure, when a waveform generator, such as any of the waveform generators 322, applies an RF tone to generate an acoustic wave in a channel, a portion of the RF tone and/or the acoustic wave may "leak" into one or more neighboring channels (e.g., adjacent channel or nearby channel). For example, if the waveform generator 322b generates the second RF tone to generate the second acoustic wave in the second channel 330b, a portion of the second RF tone and/or a portion of the second acoustic wave may undesirably interact with the first channel 330a, the third channel 330c, and/or the fourth channel 330d. The portion of the second RF tone and/or the portion of the second acoustic wave that spills over into the other channels may interfere with one or more of the frequency, phase, and/or amplitude of at least one of the individual optical beams 210a, 210c, 210d, for example.

In an illustrative example, a portion of the second RF tone and/or a portion of the second acoustic wave may undesirably interact with the third channel 330c causing what may be referred to as a crosstalk effect, crosstalk noise, or crosstalk error on the third channel 330c. The portion of the second RF tone that couples or interacts with the third channel 330c may be referred to as RF crosstalk, and the portion of the second acoustic wave that couples or interacts with the third channel 330c may be referred to as acoustic crosstalk. The RF crosstalk may result from electronic coupling between traces or electrodes in the second channel 330b and traces or electrodes in the third channel 330c. The acoustic crosstalk may result from spatial overlap of the wings or spreading of an acoustic column formed in the second channel 330b with an acoustic column formed in the third channel 330c. A portion of the crosstalk may be coherent crosstalk. Although incoherent crosstalk may also occur, it tends to occur through different mechanisms than those described herein. In some instances, the crosstalk may appear as a coherent drive signal (e.g., a sinusoidal wave) in the neighboring channel (e.g., the third channel 330c). The portion of the second RF tone and/or the portion of the second acoustic wave may cause unintentional vibration of the crystal in the third channel 330c, which may, in turn, cause one or more of the frequency, phase, and/or amplitude of the individual beam 210c to change undesirably. In one example, the second channel 330b may be turned on and the crosstalk may cause the third channel 330c to be unintentionally turned on, e.g., to deflect the light. The waveform generator 322c may provide a compensation RF tone that reduces, cancels, or eliminates the crosstalk effect caused by the portion of the second RF tone and/or the portion of the second acoustic wave. In one aspect of the present disclosure, the waveform generator 322c may provide a compensation RF tone that destructively interferes with a crosstalk effect caused by the second RF tone, and/or a compensation RF tone that generates a compensation acoustic wave that destructively interferes with a crosstalk effect caused by the second acoustic wave (explained in detail below).

Figure 4:
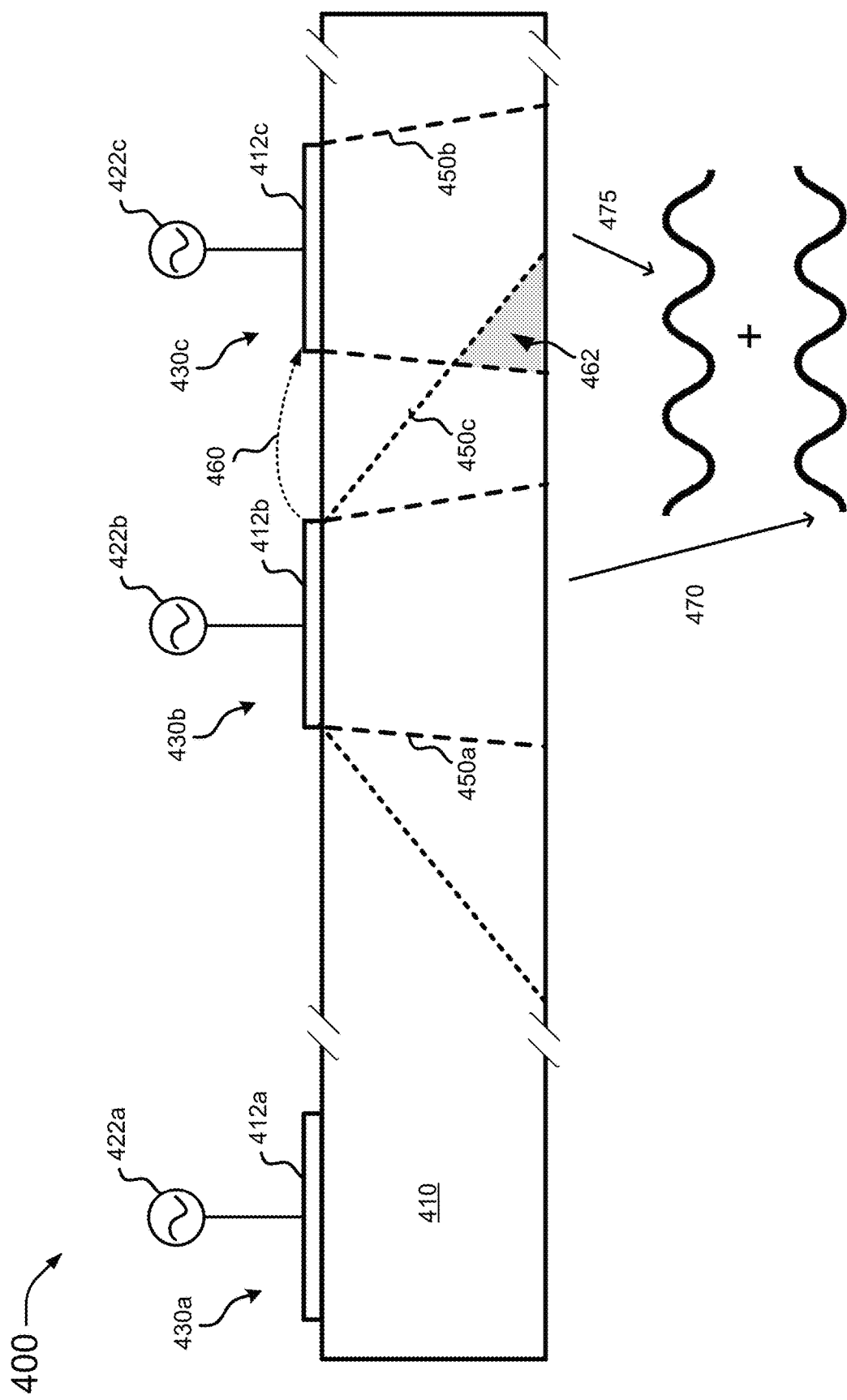
FIG. 4 is a diagram illustrating an example of an AOM system suppressing crosstalk using cancellation tones in accordance with aspects of the present disclosure.

Turning to FIG. 4, an example of an AOM 400 illustrates suppressing crosstalk using cancellation tones according to aspects of the present disclosure. FIG. 4 shows a cross-sectional view of the AOM 400, which is a multi-channel AOM and an example of the AOM 310 in the system 300 in FIG. 3. The AOM 400 may include a first channel 430a, a second channel 430b, and a third channel 430c, although additional channels may be present, where all the channels are formed on an AOM crystal 410. The AOM 400 may include a first waveform generator 422a configured to transmit a first RF tone to a first transducer 412a (e.g., to traces or electrodes of the first transducer 412a) to generate a first acoustic wave. The AOM 400 may include a second waveform generator 422b configured to transmit a second RF tone to a second transducer 412b to generate a second acoustic wave. The AOM 400 may include a third waveform generator 422c configured to transmit a third RF tone to a third transducer 412c to generate a third acoustic wave.

During operation, in some instances, the second waveform generator 422b may transmit or apply the second RF tone to excite an acoustic column associated with the second acoustic wave that is generated in the second channel 430b. A typical acoustic column 450a (dashed lines) is a narrow column isolated or decoupled from another acoustic column such as an adjacent acoustic column 450b that may be separately excited in connection with the third channel 430c. The second RF tone may inadvertently cause a crosstalk effect in the third channel 430c. For example, the application of the second RF tone to the second transducer 412b may cause an RF crosstalk 460 and/or an acoustic crosstalk 462 that interacts with the third channel 430c. That is, the application of the second RF tone to the traces or electrodes of the second transducer 412b may result in an RF coupling or RF crosstalk 460 with the traces or electrodes of the third transducer 412c. In such a case, a signal that is smaller but proportional to the second RF tone may appear to be applied to the third transducer 412c even though no such signal is being generated by the third waveform generator 422c. This coupled signal may be sufficiently strong to, for example, unintentionally turn on the third channel 430c and excite the acoustic column 450b, or change the characteristics of the acoustic column 450b if the third channel 430c is on.

In another example, the acoustic column associated with the second acoustic wave that is generated in the second channel 430b may not be confined to a narrow acoustic column 450a (dashed lines) but instead has components throughout a broad acoustic column 450c (dotted lines) that overlaps (shade) with a region where the acoustic column 450b is to be formed. This overlap causes the second channel 430b to introduce an acoustic crosstalk 462 to the third channel 430c by either at least partially turning on the third channel 430c when the third channel 430c is off or by changing the characteristics of the acoustic column 450b when the third channel 430c is turned on. Note that the effect of the acoustic crosstalk 462 varies depending on where it happens in the third channel 430c. In this example, the acoustic crosstalk 462 occurs mostly on the left side of the third channel 430c such that the right side of the third channel 430c sees little to no acoustic crosstalk effects. It is to be understood that the RF crosstalk and the acoustic crosstalk discussed above may occur individually or in combination. The overall crosstalk effect produced by the second channel 430b on the third channel 430c can be illustrated by a signal 470.

To reduce the overall crosstalk effect on the third channel 430c caused by the RF crosstalk 460 and/or the acoustic crosstalk 462 (e.g., to reduce the overall crosstalk illustrated by the signal 470), the third waveform generator 422c may transmit or apply a compensation RF tone. The compensation RF tone may generate a compensation acoustic tone. In one implementation, the compensation RF tone, and therefore the compensation acoustic tone generated from the compensation RF tone, may destructively interfere with the crosstalk effect and may cancel, reduce, or eliminate the crosstalk effect on the third channel 430c. This destructive interference may be illustrated by a signal 475 that is used to cancel the signal 470 that illustrates the crosstalk effect. The signal 475 is of about the same amplitude and inverse phase (i.e., 180°/it radian out of phase) as the crosstalk effect signal 470. This compensation RF tone may be applied by itself to turn the third channel "off", or applied along with the desired drive signal for the third channel.

It is to be understood that the compensation technique described in connection with FIG. 4 reflects a simple scenario in which two channels interact with each other. It may be the case that the compensation RF tone that is applied to reduce the crosstalk effect on one channel may cause its own crosstalk effect on an adjacent or nearby channel. Such a situation may require that multiple channels calculate or compute compensation RF tones, apply those compensation RF tones by themselves or with the desired drive signal, evaluate the effect of the compensation RF tones on the multiple channels, and iterate if necessary, by calculating or computing new compensation RF tones until an acceptable overall crosstalk reduction is achieved (e.g., a certain threshold level is met).

Figure 5:
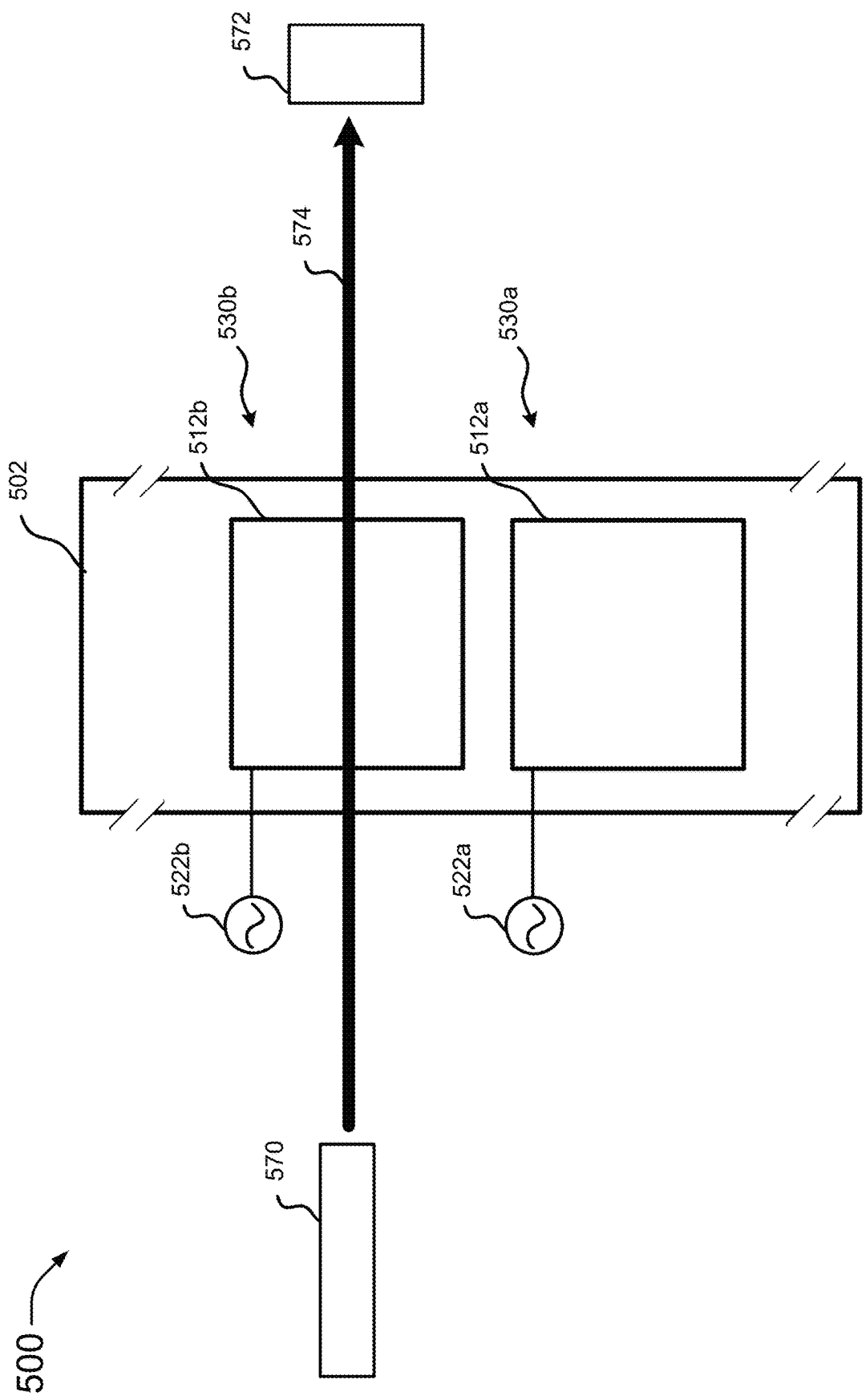
FIG. 5 is a diagram illustrating an example of an AOM system for measuring channel crosstalk in accordance with aspects of the present disclosure.

Referring now to FIG. 5, illustrated is an example of a system 500 for measuring channel crosstalk. The system 500 may include an AOM 502, an optical source 570, and a detector 572. The AOM 502 may be a multi-channel AOM and may be an example of the multi-channel AOMs 310 and 400 described above. The system 500 may include a first channel 530a and a second channel 530b. The system 500 may include a first waveform generator 522a configured to transmit a first RF tone to a first transducer 512a to generate a first acoustic wave associated with a corresponding acoustic column. The system 500 may include a second waveform generator 522b configured to transmit a second RF tone to a second transducer 512b to generate a second acoustic wave associated with a corresponding acoustic column.

During operation to measure channel crosstalk, the optical source 570 may emit an optical beam 574. It is to be understood that the optical beam 574 may pass through various optical and/or optoelectronic devices before reaching the AOM 502. The detector 572 may detect the optical beam 574, including the optical properties of the optical beam 574, such as the amplitude, phase, and/or frequency of the optical beam 574. In some instances, during channel crosstalk measurement, the first waveform generator 522a may apply a first RF tone (e.g., at maximum power of the first waveform generator 522a) to the first channel 530a at a frequency f and zero phase (or some other reference phase). The first RF tone may be described by the equation $A\sin(2\pi ft+\Phi)$, where A is the amplitude of the first RF tone and $\Phi$ is the phase of the first RF tone (e.g., zero phase). The first RF tone may induce a crosstalk effect on the second channel 530b, which is off at the time. As described above, this crosstalk effect may be caused by one or both of an RF crosstalk (e.g., electrical coupling) or an acoustic crosstalk (e.g., acoustic column overlap). The crosstalk effect on the second channel 530*b* may cause the optical properties of the optical beam 574 to change, such as the amplitude, phase, and/or frequency of the optical beam 574. The detector 572 may detect the optical beam 574 and the change in the optical properties of the optical beam 574. The second waveform generator 522*b* may apply a compensation RF tone to the second channel 530*b* at the frequency f, which produces a corresponding compensation acoustic wave in the second channel 530*b*. The second waveform generator 522*b* may iteratively adjust (manually or automatically via a feedback) the amplitude and/or the phase of the compensation RF tone until the change in the optical properties of the optical beam 574 is minimized or substantially minimized for the frequency f. The compensation RF tone may be described by the equation $A(a_{1\to 2})\sin(2\pi ft+\Phi+\Theta_{1\to 2})$, where $a_{1\to 2}$ is the amplitude adjustment factor of the compensation RF tone and $\Theta_{1\to 2}$ is the phase adjustment factor of the compensation RF tone. In some examples, the process above may be repeated for one or more frequencies of the optical beam 574. In other non-limiting examples, the process above may be repeated for one or more channels (e.g., the first channel 530*a*) of the AOM 502.

In certain implementations, the compensation RF tone may have a lower amplitude than the first RF tone (i.e., $a_{1\to 2}$ is less than 1).

In some instances of the present disclosure, the compensation RF tone may correct RF crosstalk and/or acoustic crosstalk from more than one channel. The compensation RF tones may superimpose multiple amplitude adjustment factors and/or phase adjustment factors from a plurality of channels.

In certain implementation, the compensation RF tone may be superimposed onto the second RF tone applied by the second waveform generator 522*b*.

In some aspects of the present disclosure, the compensation RF tone may be adjusted depending on the location of the optical beam 574 within the second channel 530*b*. For example, if the optical beam 574 is closer to the first channel 530*a* (i.e., where there may be higher RF and/or acoustic crosstalk noise), the compensation RF tone may have higher energy. If the optical beam 574 is farther from the first channel 530*a* (i.e., where there may be lower RF and/or acoustic crosstalk noise), the compensation RF tone may have lower energy.

In an implementation, the detector 572 may be a photodiode, a photodetection system, an atom, or a trapped ion in a chain like the chain 110 described above. For example, the detector 572 can be a photodiode that captures a large area or a photodiode that detects a portion of a field through an aperture, or a photodiode that responds to low light levels such as a PIN photodiode or avalanche photodiode or one with lower responsivity.

In other implementations, the system 500 may be integrated into a quantum computer to perform in-situ measurement/calibration to generate the compensation RF tones for each channel of the AOM 502. The compensation RF tone may reduce the crosstalk between the quantum gates of the quantum computer.

In some examples of the present disclosure, the compensation RF tones may cancel other crosstalk signals, such as crosstalk signals from non-adjacent (e.g., spatial) channels in an AOM.

In an implementation, the signals measured by the detector 572 may be smoothed or averaged to reduce measurement noise.

In certain implementations, the compensation RF tones may cancel coherent crosstalk noises from physical mechanisms other than electronic coupling, acoustic overlap, or a combination of the two. Examples of the physical mechanisms may include ambient noise, temperature fluctuations, etc.

In certain implementations, the crosstalk measurements may be performed in one AOM and those measurements may be used with another similar AOM.

Moreover, aspects of the system 500 may be applicable to the scenario described above in which the compensation RF tone that is applied to reduce the crosstalk effect on one channel may cause its own crosstalk effect on an adjacent or nearby channel, where such situation may also involve multiple channels and the need to iteratively compute or calculate compensation RF tones in the multiple channels until an acceptable overall crosstalk reduction is achieved (e.g., the crosstalk effect in each of the channels is below a certain level).

Figure 6:
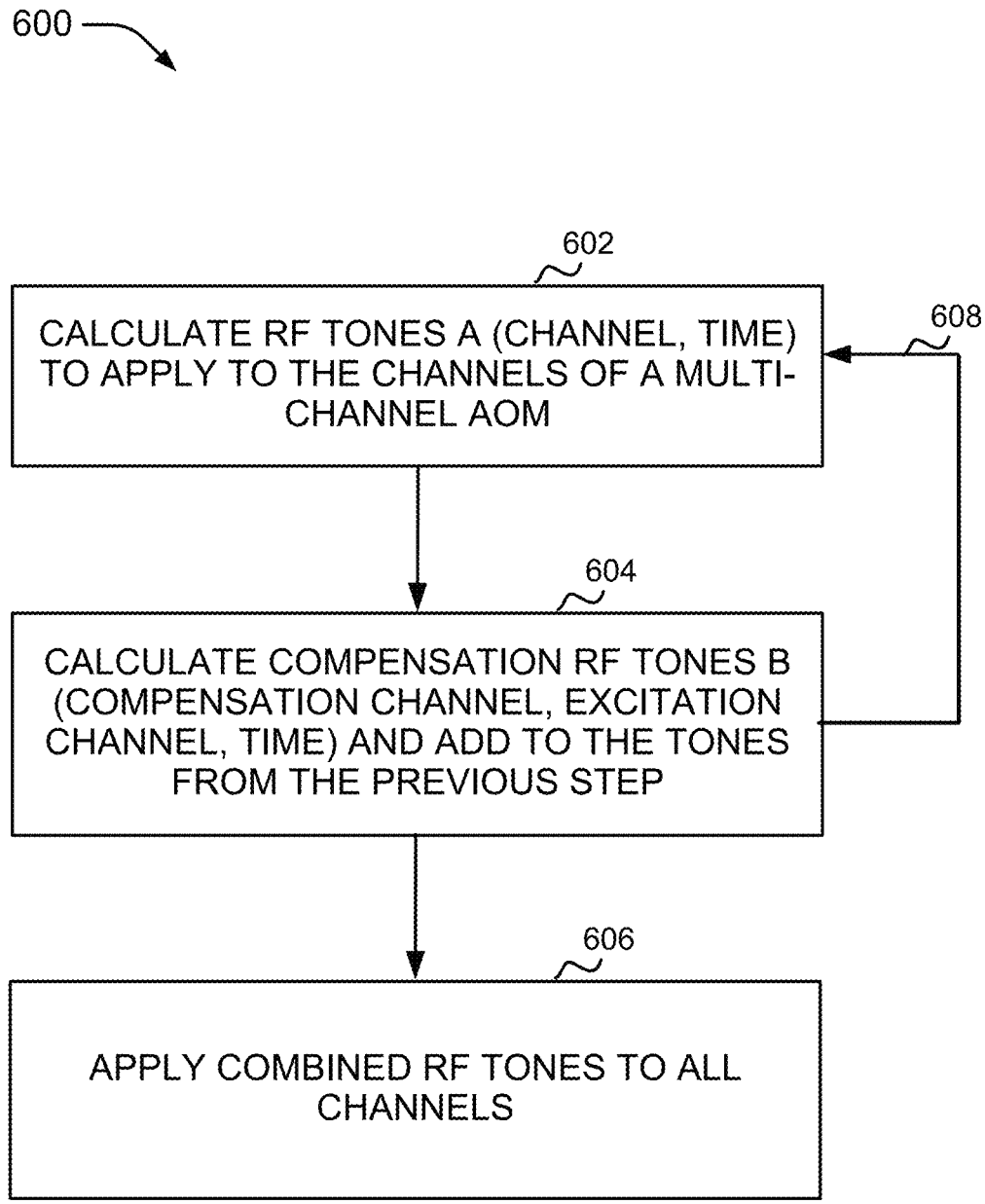
FIG. 6 is a flow diagram that illustrates using cancellation or compensation tones to the channels of an AOM to suppress crosstalk in accordance with aspects of the disclosure.

Referring to FIG. 6, a method or flow diagram 600 is described that illustrates the application of cancellation or compensation tones to the channels of an AOM to suppress crosstalk in accordance with aspects of the disclosure. The method 600 may be performed in a computer system such as a computer device 900 described below, where, for example, a processor 910, a memory 920, a data store 940, and/or an operating system 960 may be used to perform the functions of the method 600. Similarly, the functions of the method 600 may be performed by one or more components of a QIP system such as a QIP system 800 described below and its components (e.g., the optical controller 820, a crosstalk controller 840, and/or their subcomponents).

At block 602, the method 600 may include calculating RF waves or tones for all channels of the multi-channel AOM (e.g., initial RF waves or tones A calculated in connection with channel and time). Using compensation corrections such as those determined by the techniques described above in relation to FIGS. 4 and 5, compensation RF waves are calculated for these initial RF waves at block 604 (e.g., compensation RF waves or tones B calculated in connection with compensation channel, excitation channel and time). These compensation RF waves or tones are then added to the initial RF waves or tones for each channel. Since the compensation RF waves or tones themselves may generate crosstalk, this compensation RF wave or tone calculation may be performed one or more times 608 (e.g., in an iterative manner). Finally, at block 606, the calculated RF waves or tones (e.g., combined initial RF wave or tone in addition to an optimized compensation RF wave or tone) that reduce the effect of the RF crosstalk and/or the acoustic crosstalk on all channels may be applied to the multi-channel AOM.

Figure 7:
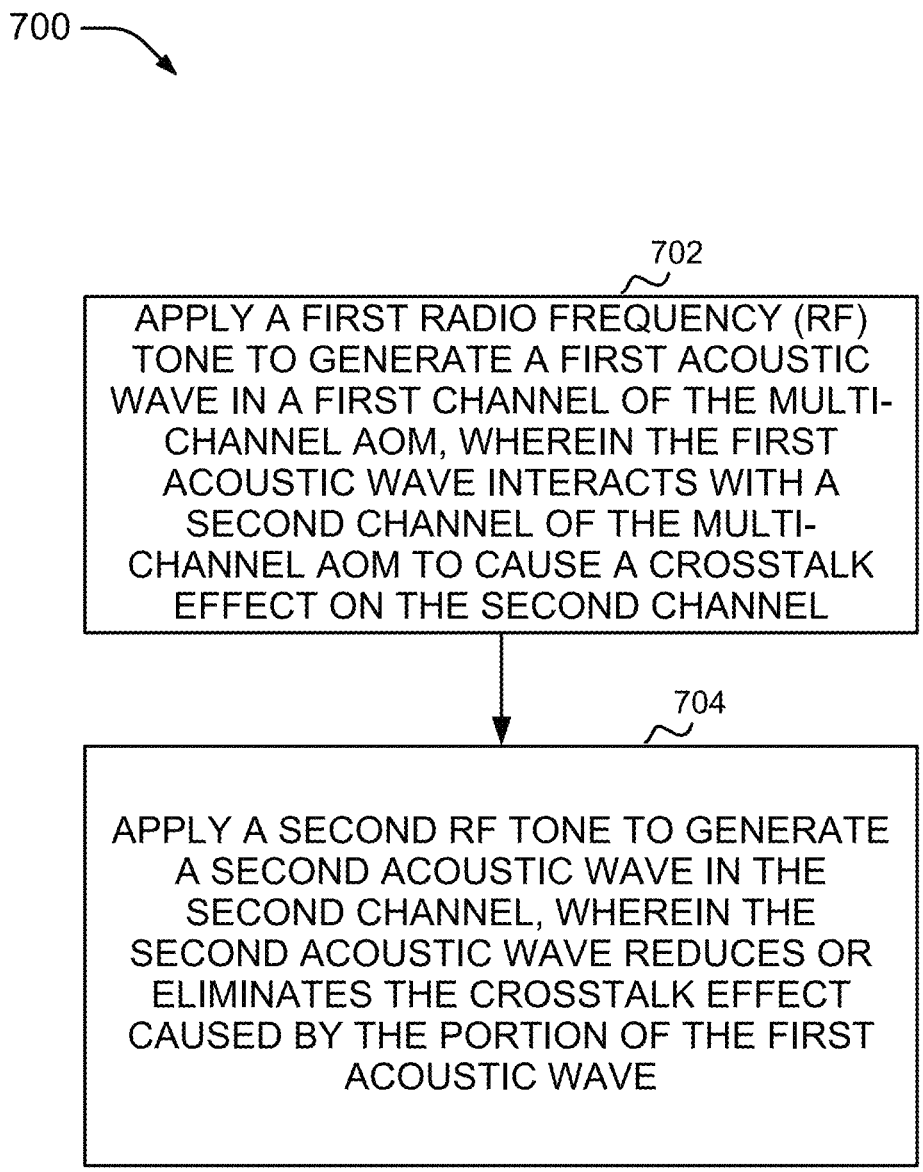
FIG. 7 is a flow diagram that illustrates using cancellation tones in the computation of the tones applied to the AOM to suppress crosstalk in accordance with aspects of this disclosure.

Referring to FIG. 7, a method 700 of operating a multi-channel AOM to compensate for coherent crosstalk noise may be performed in a computer system such as the computer device 900 described below, where, for example, the processor 910, the memory 920, the data store 940, and/or the operating system 960 may be used to perform the functions of the method 700. Similarly, the functions of the method 700 may be performed by one or more components of a QIP system such as the QIP system 800 and its components (e.g., the optical controller 820, the crosstalk controller 840, and/or their subcomponents).

It is to be understood that while the method 600 in FIG. 6 generally describes a scenario in which there are many channels and the compensation RF tones may themselves cause crosstalk effects, the method 700 described below is associated with a different but related scenario. Nevertheless, the same techniques that are described herein may be applied in connection with the method 600 and the method 700.

At block 702, the method 700 may include applying a first radio frequency (RF) tone to generate a first acoustic wave in a first channel of the multi-channel AOM, wherein the first acoustic wave interacts with a second channel of the multi-channel AOM to cause a crosstalk effect on the second channel. For example, the second waveform generator 422b may apply the second RF tone to generate the second acoustic wave in the second channel 430b. Due to the application of the second RF tone, an RF crosstalk and/or an acoustic crosstalk may affect the third channel 430c.

At block 704, the method 700 may include applying a second RF tone to generate a second acoustic wave in the second channel, wherein the second acoustic wave reduces or eliminates the crosstalk effect caused by the portion of the first acoustic wave. For example, the third waveform generator 422c may apply a compensation RF tone to generate a compensation acoustic tone to reduce the effect of the RF crosstalk and/or the acoustic crosstalk on the third channel 430c.

In an aspect of the method 700, the first channel includes electrical traces to which the first RF tone is applied to excite an acoustic column associated with the first acoustic wave, the second channel includes electrical traces to which the second RF tone is applied to excite an acoustic column associated with the second acoustic wave, the portion of the first RF tone interacts with the second channel by having the portion of the first RF tone couple to the electrical traces of the second channel, and the portion of the first acoustic wave interacts with the second channel by having the acoustic columns associated with the first acoustic wave and the second acoustic wave overlap.

In another aspect of the method 700, applying the first RF tone turns on the first channel, and applying the second RF tone reduces or eliminates the crosstalk effect such that turning on the first channel does not cause the second channel to unintentionally be turned on by the first RF tone.

Figure 8:
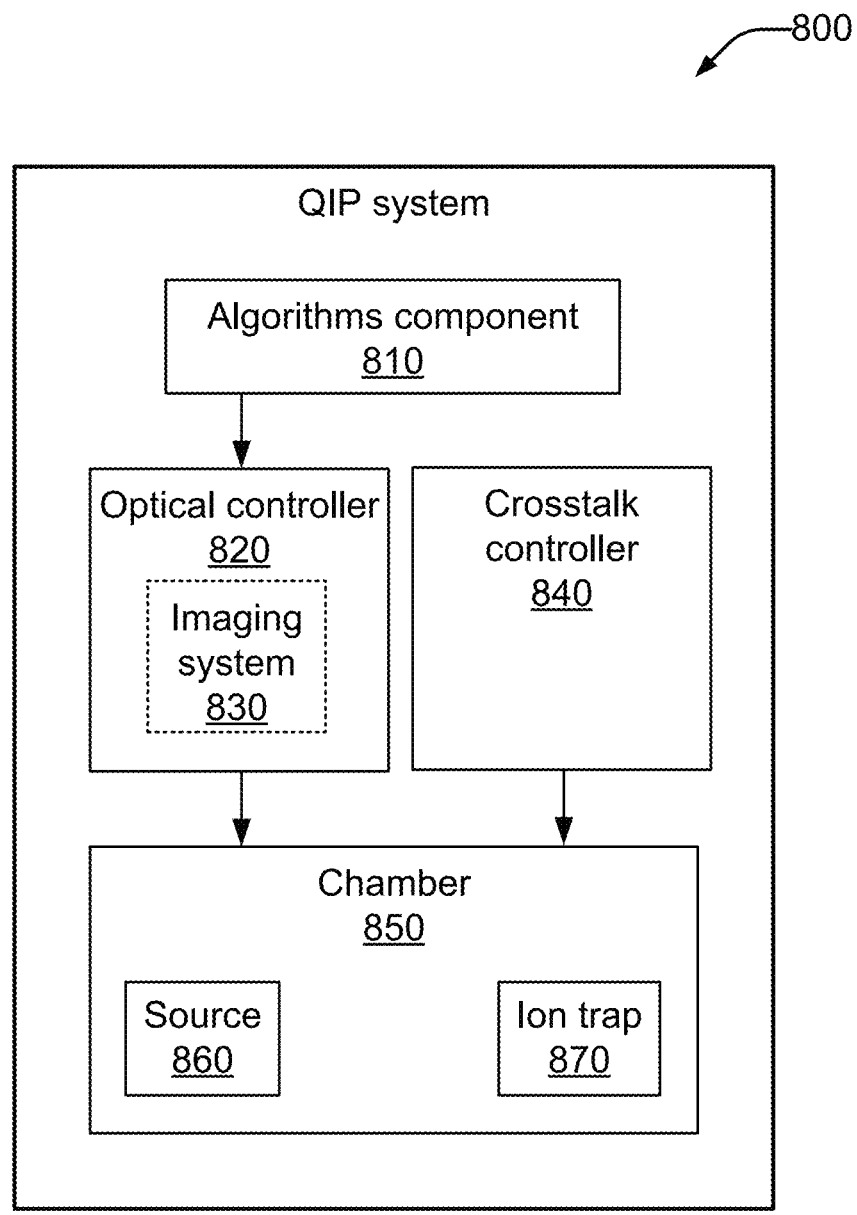
FIG. 8 is a block diagram that illustrates an example of a quantum information processing (QIP) system in accordance with aspects of this disclosure.

FIG. 8 is a block diagram that illustrates an example of a QIP system 800 in accordance with aspects of this disclosure in which the techniques described above to control coherent crosstalk errors in multi-channel AOM using cancelation tones can be implemented. The QIP system 800 may also be referred to as a quantum computing system, a computer device, a trapped ion system, or the like.

The QIP system 800 can include a source 860 that provides atomic species (e.g., a plume or flux of neutral atoms) to a chamber 850 having an ion trap 870 that traps the atomic species once ionized (e.g., photoionized) by the source 860. The ion trap 870 may be part of a processor or processing portion of the QIP system 800.

The imaging system 830 can include a high resolution imager (e.g., CCD camera) for monitoring the atomic ions while they are being provided to the ion trap or after they have been provided to the ion trap 870. In an aspect, the imaging system 830 can be implemented separate from the optical controller 820, however, the use of fluorescence to detect, identify, and label atomic ions using image processing algorithms may need to be coordinated with the optical controller 820. The AOMs described above, as well as the photodetectors and optical beam sources, may be part of the optical controller 820.

The QIP system 800 may also include an algorithms component 810 that may operate with other parts of the QIP system 800 (not shown) to perform quantum algorithms or quantum operations, including a stack or sequence of combinations of single qubit operations and/or multi-qubit operations (e.g., two-qubit operations) as well as extended quantum computations. As such, the algorithms component 810 may provide instructions to various components of the QIP system 800 (e.g., to the optical controller 820) to enable the implementation of the quantum algorithms or quantum operations.

The QIP system 800 may also include a crosstalk controller 840 that is configured to perform the techniques described above to control coherent crosstalk errors in multi-channel AOM using cancelation tones. In one example, the crosstalk controller 840 may apply the appropriate cancellation tones based on information collected by measurements performed by the crosstalk controller 840 or by information collected separately and stored in the crosstalk controller 840.

Figure 9:
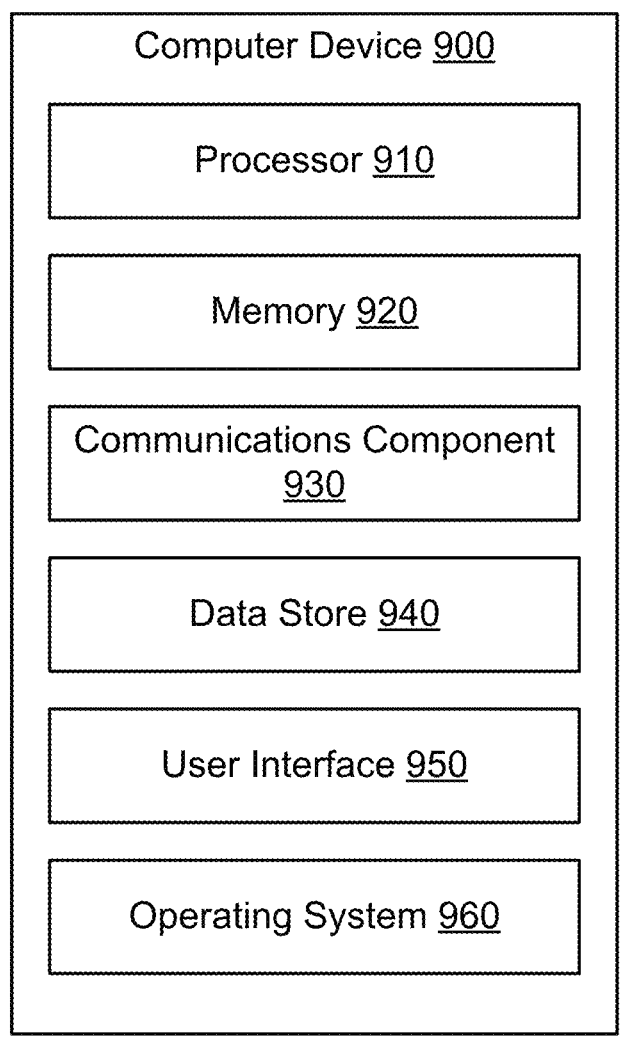
FIG. 9 is a diagram that illustrates an example of a computer device in accordance with aspects of this disclosure.

Referring now to FIG. 9, illustrated is an example computer device 900 in accordance with aspects of the disclosure. The computer device 900 can represent a single computing device, multiple computing devices, or a distributed computing system, for example. The computer device 900 may be configured as a quantum computer (e.g., a QIP system), a classical computer, or a combination of quantum and classical computing functions. For example, the computer device 900 may be used to process information using quantum algorithms based on trapped ion technology and may therefore implement methods to control coherent crosstalk errors in multi-channel AOM using cancelation tones A generic example of the computer device 900 as a QIP system that can implement the various compensation schemes described herein is illustrated in an example shown in FIG. 6.

In one example, the computer device 900 may include a processor 910 for carrying out processing functions associated with one or more of the features described herein. The processor 910 may include a single or multiple set of processors or multi-core processors. Moreover, the processor 910 may be implemented as an integrated processing system and/or a distributed processing system. The processor 910 may include a central processing unit (CPU), a quantum processing unit (QPU), a graphics processing unit (GPU), or combination of those types of processors. In one aspect, the processor 910 may refer to a general processor of the computer device 900, which may also include additional processors 910 to perform more specific functions such as functions for individual beam control.

In an example, the computer device 900 may include a memory 920 for storing instructions executable by the processor 910 for carrying out the functions described herein. In an implementation, for example, the memory 920 may correspond to a computer-readable storage medium that stores code or instructions to perform one or more of the functions or operations described herein. In one example, the memory 920 may include instructions to perform aspects of a methods 600 and 700 described above in connection with FIGS. 6 and 7. Just like the processor 910, the memory 920 may refer to a general memory of the computer device 900, which may also include additional memories 920 to store instructions and/or data for more specific functions such as instructions and/or data for individual beam control.

Further, the computer device 900 may include a communications component 930 that provides for establishing and maintaining communications with one or more parties utilizing hardware, software, and services as described herein. The communications component 930 may carry communications between components on the computer device 900, as well as between the computer device 900 and external devices, such as devices located across a communications network and/or devices serially or locally connected to computer device 900. For example, the communications component 930 may include one or more buses, and may further include transmit chain components and receive chain components associated with a transmitter and receiver, respectively, operable for interfacing with external devices.

Additionally, the computer device 900 may include a data store 940, which can be any suitable combination of hardware and/or software, that provides for mass storage of information, databases, and programs employed in connection with implementations described herein. For example, the data store 940 may be a data repository for operating system 960 (e.g., classical OS, or quantum OS). In one implementation, the data store 940 may include the memory 920.

The computer device 900 may also include a user interface component 950 operable to receive inputs from a user of the computer device 900 and further operable to generate outputs for presentation to the user or to provide to a different system (directly or indirectly). The user interface component 950 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 950 may include one or more output devices, including but not limited to a display, a speaker, a haptic feedback mechanism, a printer, any other mechanism capable of presenting an output to a user, or any combination thereof.

In an implementation, the user interface component 950 may transmit and/or receive messages corresponding to the operation of the operating system 960. In addition, the processor 910 may execute the operating system 960 and/or applications or programs, and the memory 920 or the data store 940 may store them.

When the computer device 900 is implemented as part of a cloud-based infrastructure solution, the user interface component 950 may be used to allow a user of the cloud-based infrastructure solution to remotely interact with the computer device 900. The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A multi-channel acousto-optic modulator (AOM) system, comprising:
    an AOM crystal;
    a first transducer disposed over the AOM crystal and associated with a first channel of the multi-channel AOM system;
    a second transducer disposed over the AOM crystal and associated with a second channel of the multi-channel AOM system;
    a first waveform generator configured to apply a first radio frequency (RF) tone to activate the first transducer to generate a first acoustic wave in at least the first channel, wherein a portion of the first acoustic wave interacts with the second channel to cause a crosstalk effect on the second channel; and
    a second waveform generator configured to apply a second RF tone to activate the second transducer to generate a second acoustic wave in the second channel, wherein the second acoustic wave reduces or eliminates the crosstalk effect caused by the portion of the first acoustic wave within the second channel.

2. The multi-channel AOM system of claim 1, wherein:
    the first transducer includes electrical traces to which the first RF tone is applied to excite an acoustic column associated with the first acoustic wave,
    the second transducer includes electrical traces to which the second RF tone is applied to excite an acoustic column associated with the second acoustic wave,
    the portion of the first RF tone interacts with the second channel by having the portion of the first RF tone coupled to the electrical traces of the second transducer, and
    the portion of the first acoustic wave interacts with the second channel by having the acoustic columns associated with the first acoustic wave and the second acoustic wave overlap.

3. The multi-channel AOM system of claim 1, further comprising a photodetector configured to measure the crosstalk effect of the portion of the first acoustic wave from an optical beam deflected from the second channel to the photodetector.

4. The multi-channel AOM system of claim 3, wherein the second waveform generator is further configured to adjust, prior to the application of the second RF tone and based on the measured crosstalk effect, the second RF tone such that an amplitude of the second RF tone is smaller than and proportional to an amplitude of the first RF tone and a phase of the second RF tone is an inverse of a phase of the first RF tone.

5. The multi-channel AOM system of claim 3, wherein the second waveform generator is further configured to adjust, prior to the application of the second RF tone and based on the measured crosstalk effect, the second RF tone such that an amplitude of the second acoustic wave is smaller than and proportional to an amplitude of the first acoustic wave and a phase of the second acoustic wave is an inverse of a phase of the first acoustic wave.

6. The multi-channel AOM system of claim 3, further comprising:
    an optical source configured to emit an optical beam through the second channel;
    wherein:
        the photodetector is configured to measure a change in one or more optical characteristics of the optical beam in response to applying the first RF tone; and
        the second waveform generator is configured to adjust the second RF tone to minimize the change in the one or more optical characteristics of the optical beam.

7. The multi-channel AOM system of claim 6, wherein the one or more optical characteristics include at least one of a phase, a frequency, or an amplitude of the optical beam.

8. The multi-channel AOM system of claim 1, further comprising an ion trap having at least one trapped ion, the at least one trapped ion being configured to measure the crosstalk effect of the at least one of the portion of the first RF tone or the portion of the first acoustic wave from an optical beam deflected from the second channel to the at least one trapped ion.

9. The multi-channel AOM system of claim 1, further comprising:
a third transducer disposed over the AOM crystal and associated with a third channel of the multi-channel AOM system;
a third waveform generator configured to apply a third RF tone to activate the third transducer to generate a third acoustic wave in at least the third channel, wherein at least one of a portion of the third RF tone or a portion of the third acoustic wave interacts with the second channel to cause an additional crosstalk effect on the second channel; and
a fourth waveform generator configured to apply a fourth RF tone to generate a fourth acoustic wave in the second channel, wherein the fourth acoustic wave reduces or eliminates the crosstalk effect caused by the portion of the third acoustic wave.

10. The multi-channel AOM of claim 9, wherein:
the third channel includes electrical traces to which the third RF tone is applied to excite an acoustic column associated with the third acoustic wave,
the second channel includes electrical traces to which the second RF tone is applied to excite an acoustic column associated with the second acoustic wave,
the portion of the third RF tone interacts with the second channel by having the portion of the third RF tone coupled to the electrical traces of the second channel, and
the portion of the third acoustic wave interacts with the second channel by having the acoustic columns associated with the third acoustic wave and the second acoustic wave overlap.

11. The multi-channel AOM system of claim 1, further comprising:
a third transducer disposed over the AOM crystal and associated with a third channel of the multi-channel AOM system; and
a third waveform generator configured to apply a third RF tone to activate the third transducer to generate an additional acoustic wave in the second channel, wherein the additional acoustic wave is superimposed onto the second acoustic wave to control deflection of optical beams from the second channel.

12. The multi-channel AOM system of claim 1, wherein the first channel is immediately adjacent to the second channel in the multi-channel AOM.

13. The multi-channel AOM system of claim 1, wherein the first channel is not immediately adjacent to the second channel in the multi-channel AOM.

* * * * *